(12) United States Patent
Ishii

(10) Patent No.: US 8,676,212 B2
(45) Date of Patent: Mar. 18, 2014

(54) USER EQUIPMENT TERMINAL AND SIGNAL POWER MEASUREMENT OF NEIGHBORING CELLS

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 208 days.

(21) Appl. No.: 12/740,164

(22) PCT Filed: Oct. 24, 2008

(86) PCT No.: PCT/JP2008/069314
§ 371 (c)(1),
(2), (4) Date: Jun. 17, 2010

(87) PCT Pub. No.: WO2009/057520
PCT Pub. Date: May 7, 2009

(65) Prior Publication Data
US 2010/0255834 A1  Oct. 7, 2010

(30) Foreign Application Priority Data

Nov. 2, 2007  (JP) .................................. 2007-286737

(51) Int. Cl.
*H04M 1/68* (2006.01)
(52) U.S. Cl.
USPC ........... 455/441; 455/436; 455/423; 455/440; 455/442; 455/67.11; 370/331
(58) Field of Classification Search
USPC ...................... 455/423, 425, 436–444, 422.1, 455/67.11–67.14, 450–455, 464, 509; 370/321–337, 339, 341–348, 431–463; 702/69, 142–147; 324/160–180
See application file for complete search history.

(56) References Cited

U.S. PATENT DOCUMENTS

| | | | | |
|---|---|---|---|---|
| 5,903,596 A * | 5/1999 | Nakano | | 375/150 |
| 7,116,957 B2 * | 10/2006 | Sih et al. | | 455/266 |
| 7,428,262 B2 * | 9/2008 | Zancho et al. | | 375/148 |
| 7,796,994 B2 * | 9/2010 | Klatt | | 455/441 |
| 7,933,599 B2 * | 4/2011 | Fernandez-Corbaton et al. | | 455/436 |
| 2004/0110524 A1 * | 6/2004 | Takano et al. | | 455/522 |

(Continued)

FOREIGN PATENT DOCUMENTS

| | | |
|---|---|---|
| EP | 1 868 304 A1 | 12/2007 |
| JP | 11-266198 A | 9/1999 |

(Continued)

OTHER PUBLICATIONS

3GPP TR 36.804 V0.5.0 (May 2007) 3rd Generation Partnership Project; Technical Specification Group Radio Access Network; Evolved Universal Terrestrial Radio Access (E-UTRA); Base Station (BS) radio transmission and reception; (Release 8), hereinafter TR 36.804.*

(Continued)

*Primary Examiner* — Ronald Eisner
(74) *Attorney, Agent, or Firm* — Osha Liang LLP

(57) ABSTRACT

A user equipment terminal for measuring signal power in a neighbor cell includes a movement speed estimating unit configured to estimate a movement speed of the user equipment terminal or a fading frequency of a propagation; a measurement bandwidth determining unit configured to determine a measurement bandwidth according to the movement speed or the fading frequency of the propagation; and a measurement unit configured to measure signal power in the neighbor cell within the determined measurement bandwidth.

2 Claims, 7 Drawing Sheets

(56) References Cited

U.S. PATENT DOCUMENTS

2004/0203782 A1* 10/2004 Peng et al. .................. 455/436
2005/0020219 A1  1/2005 Sih et al.
2006/0246895 A1* 11/2006 Ryu ............................. 455/434

FOREIGN PATENT DOCUMENTS

| | | |
|---|---|---|
| JP | 2002-010313 A | 1/2002 |
| JP | 2006246428 A | 9/2006 |
| JP | 2006-310973 A | 11/2006 |
| WO | 2006/106918 A1 | 10/2006 |

OTHER PUBLICATIONS

Patent Abstracts of Japan, Publication No. 2006-310973, dated Nov. 9, 2006, 1 page.
Patent Abstracts of Japan, Publication No. 11-266198, dated Sep. 28, 1999, 1 page.
3GPP TR 36.804 V0.8.0, Oct. 2007, "Base Station (BS) radio transmission and reception," 56 pages (corresponds to TSG-RAN Working Group 4 (Radio) meeting #44 bis, R4-071781, Oct. 8-12, 2007).
TSG-RAN Working Group 4 (Radio) meeting #44 bis, R4-071781, Oct. 8-12, 2007, 1 page (corresponds to 3GPP TR 36.804 V0.8.0, Oct. 2007, "Base Station (BS) radio transmission and reception,").
3GPP TR 36.803 V0.6.0, Sep. 2007, (R4-071788) "User Equipment (UE) radio transmission and reception," 67 pages.
3GPP TS 36.211 V8.0.0, Sep. 2007, "Physical channels and modulation," 50 pages.
3GPP TS 36.214 V8.0.0, Sep. 2007, "Measurements," 11 pages.
International Search Report issued in PCT/JP2008/069314, mailed on Dec. 2, 2008, with translation, 7 pages.
Written Opinion issued in PCT/JP2008/069314, mailed on Dec. 2, 2008, 3 pages.
Office Action in corresponding Japanese Patent Application No. 2009-539035 dated May 24, 2013, with translation (5 pages).
Patent Abstract of Japan for Japanese Publication No. 2006-246428, publication date Sep. 14, 2006 (1 page).
Patent Abstract of Japan for Japanese Publication No. 2002-010313, publication date Jan. 11, 2002 (1 page).

* cited by examiner

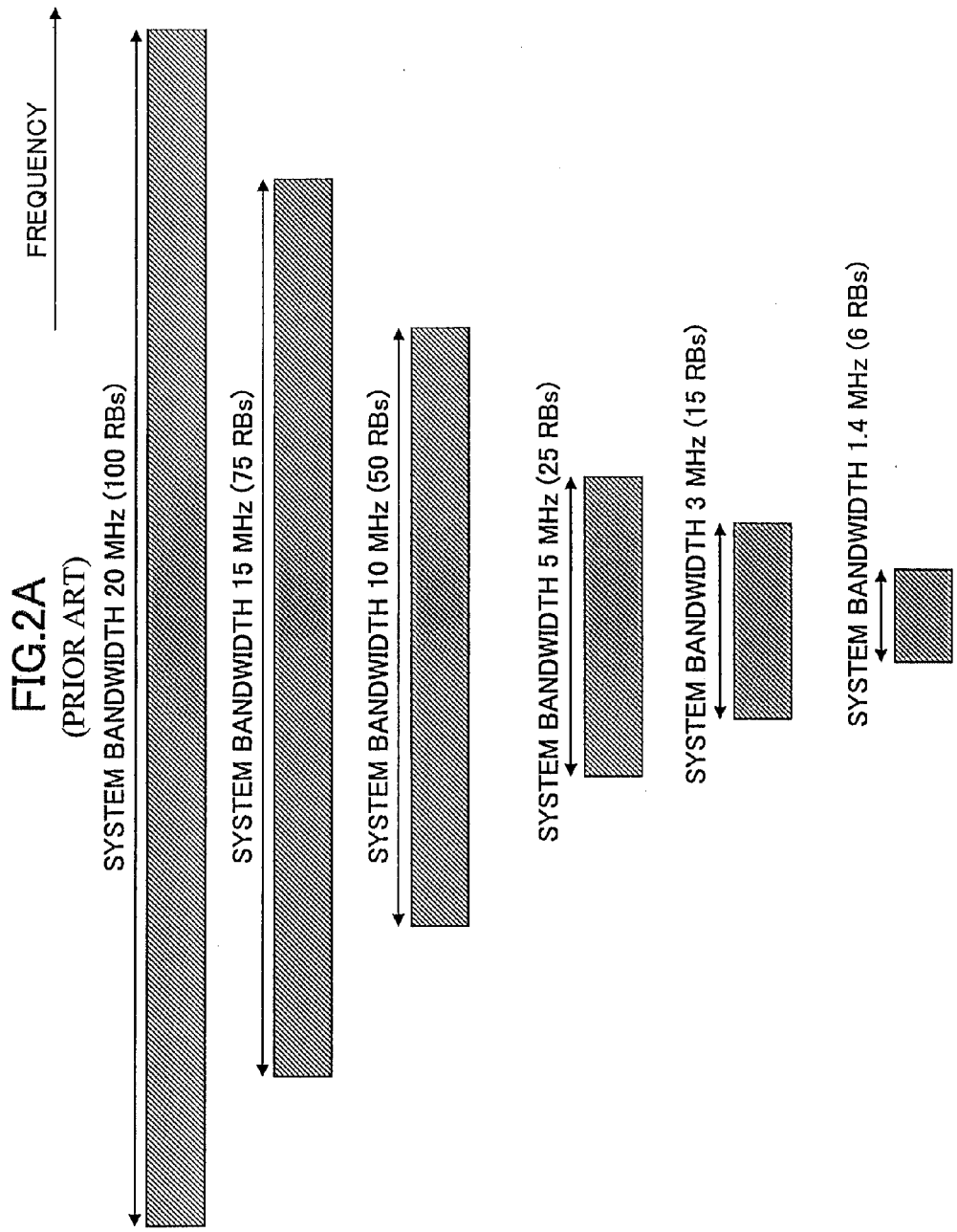

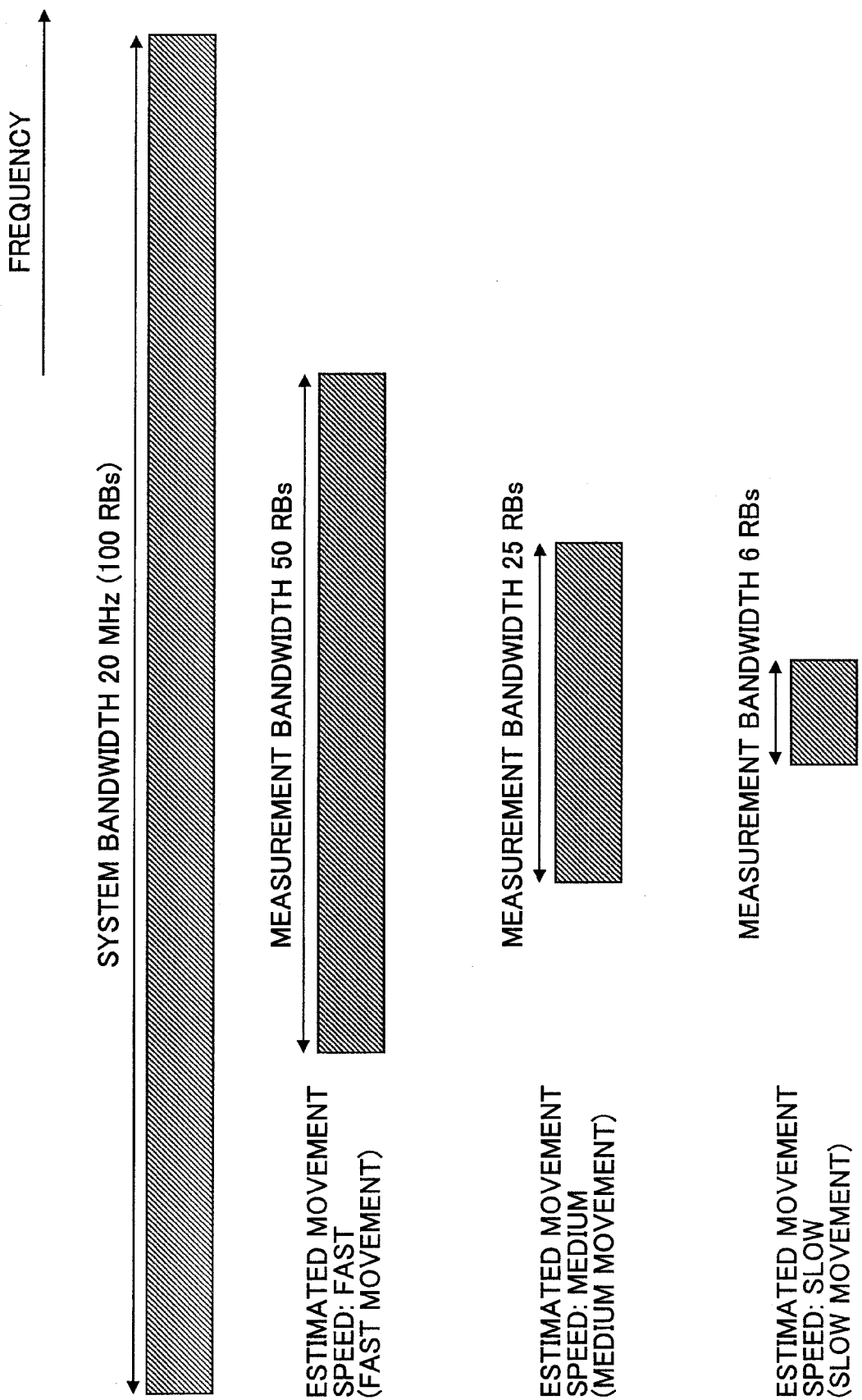

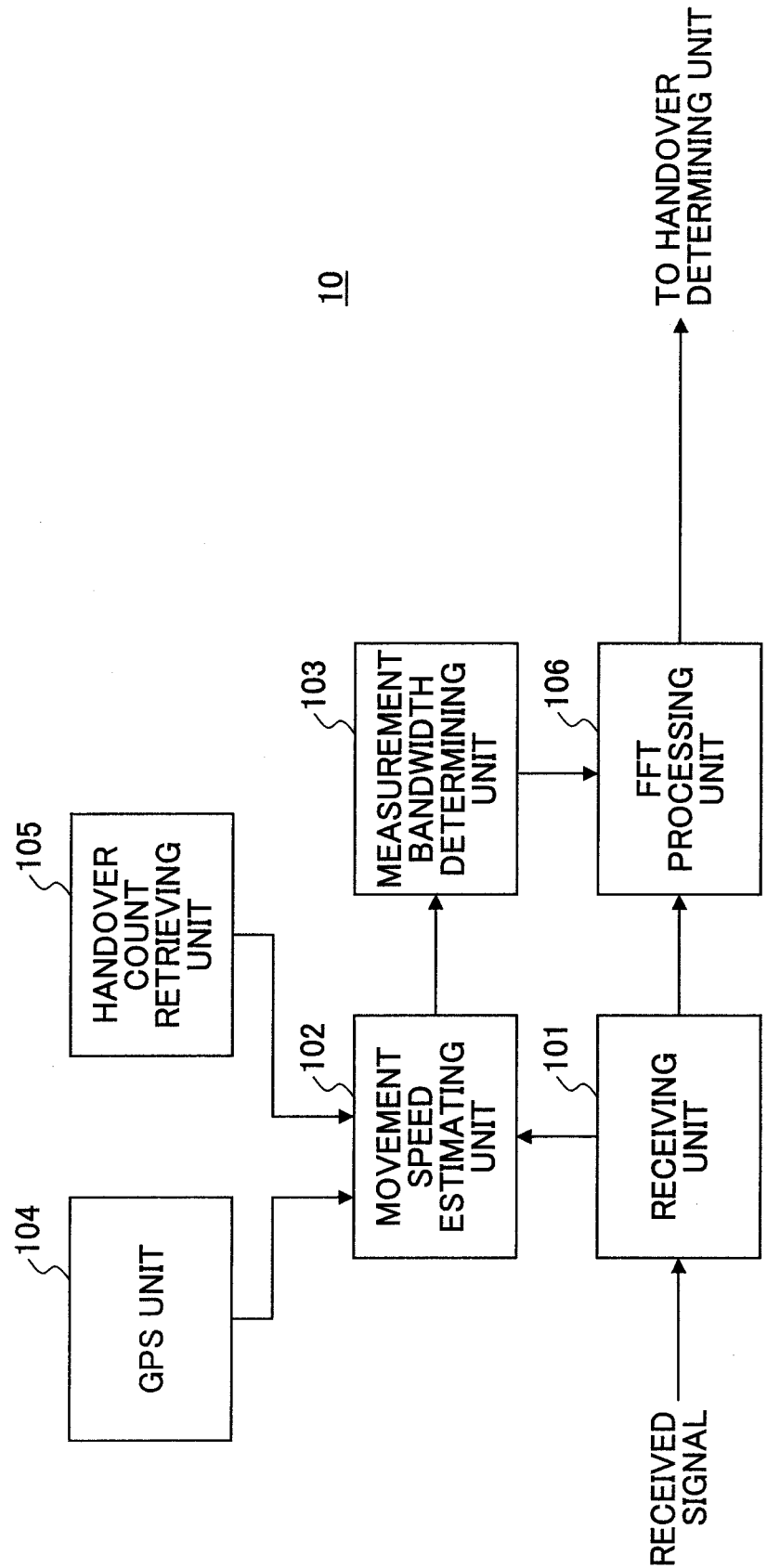

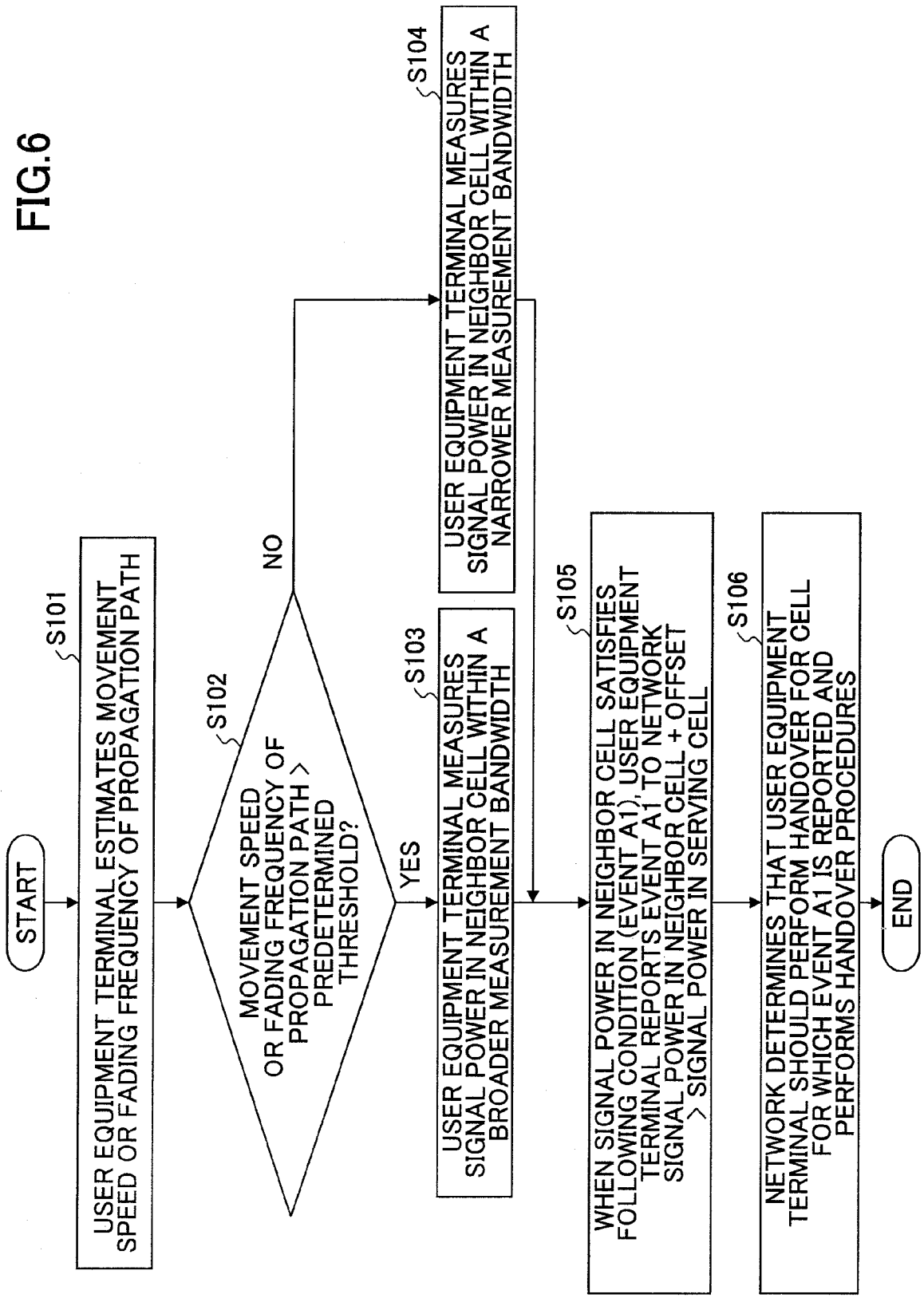

USER EQUIPMENT TERMINAL AND SIGNAL POWER MEASUREMENT OF NEIGHBORING CELLS

TECHNICAL FIELD

The present invention relates to a user equipment terminal and a signal power measurement method.

BACKGROUND ART

In a mobile communication system including plural cells, when a user equipment terminal (UE: user equipment) moves from one cell to another, the user equipment terminal switches to the other cell to continue communications. The switching to the other cell is referred to as handover. Typically, when the user equipment terminal moves to a neighbor cell and signal strength in the neighbor cell is higher than signal strength in the serving cell (cell in which the user equipment terminal originally performs communications), the user equipment terminal performs handover to the neighbor cell.

Specifically, the user equipment terminal performs handover according to the procedure shown in FIG. 1.

First, the user equipment terminal measures signal power in the neighbor cell (S1). Then, the user equipment terminal determines whether the signal power in the neighbor cell satisfies the following condition.

signal power in the neighbor cell+offset>signal power in the serving cell

When this condition is satisfied, the user equipment terminal reports an event (Event A1) to the network (base station) (S2). It should be noted that the offset is provided so as to avoid frequent handover to the neighbor cell from the serving cell at the cell boundary. The offset may be a positive value or a negative value. When the network receives the event (Event A1), the network determines that the user equipment terminal should perform handover to the cell for which the event is reported, and then performs handover procedures (S3). While the event is defined as Event A1, the event may be defined as any other event such as Event A3.

Quality in handover has a significant influence on communication quality in the mobile communication system. For example, failure in handover is not preferable because it may cause a disconnection during communications or a significant decrease in the transmission rate from the user's point of view.

When the user equipment terminals moves fast such as on a bullet train or a highway, the handover procedures need to be quickly performed in order to maintain communications. When the duration needed for the handover procedures is longer than the length of time during which the user equipment terminal moves to the adjacent cell, communications are disconnected, because the user equipment terminal enters into the coverage area of the neighbor cell (moves out of the coverage area of the serving cell) before switching to the neighbor cell.

Handover in an LTE (Long Term Evolution) system, which is a succeeding system of the W-CDMA (Wideband Code Division Multiple Access) system or the HSDPA (High Speed Downlink Packet Access) system, is described below in detail. As shown in FIG. 2A, a variable system bandwidth ranging from six resource blocks (RBs) to one hundred resource blocks can be used in the LTE system, depending on capabilities of the base station and the user equipment terminal. For example, the system bandwidth of six resource blocks, fifty resource blocks, or one hundred resource blocks may be used. The resource block is a single transmission unit in the frequency domain. The frequency bandwidth of one resource block is equal to 180 kHz (see TR 36.804, V0.8.0, Section 5.1, TR 36.803, V0.7.0, Section 5.1, and TS 36.211 V8.0.0). In the LTE system, the system bandwidth is also referred to as a channel bandwidth.

In the LTE system, RSRP (Reference Signal Received Power) is used for a handover criterion (see TS 36.214, V8.0.0, Section 5.1.1). Other than RSRP, RS-SIR (Reference Signal Signal-to-Interference Ratio), E-UTRA Carrier RSSI (Received Signal Strength Indicator), RSRQ (Reference Signal Received Quality), or the like may be used for the handover criterion.

FIG. 2B shows a conceptual diagram of measurement of RSRP in the case where the system bandwidth is equal to 20 MHz (one hundred resource blocks). The user equipment terminal may measure RSRP within the bandwidth of six resource blocks, within the bandwidth of fifty resource blocks, or within the bandwidth of one hundred resource blocks.

DISCLOSURE OF INVENTION

Problem(s) to be Solved by the Invention

Typically, received power significantly varies (instantaneous level fluctuations occur) as the user equipment terminal moves. Such fluctuations are referred to as Rayleigh fading. For measurement of RSRP, it is necessary to average and remove level fluctuations due to Rayleigh fading. Since the interval in the frequency domain used for the averaging process in measurement within a wider bandwidth is greater than that in measurement within a narrower bandwidth, the effect of level fluctuations due to Rayleigh fading can be accurately removed by the measurement within the wider bandwidth. Thus, RSRP can be accurately measured. In this manner, when RSRP is measured within a wider bandwidth, predetermined accuracy can be achieved with the averaging process in a shorter time interval. On the other hand, when RSRP is measured within a narrower bandwidth, the predetermined accuracy will be achieved with the averaging process in a longer time interval.

For example, in the LTE system supporting a variable system bandwidth ranging from 1.4 MHz to 20 MHz, a synchronization channel and a physical broadcast channel are transmitted using six resource blocks at the center of the system band. In other words, six resource blocks at the center of the system band are always used regardless of the system bandwidth. Thus, it is possible to measure RSRP in these six resource blocks, as shown in FIG. 3. Specifically, even though the neighbor cell supports the system bandwidth of one hundred resource blocks, the user equipment terminal measures RSRP in six resource blocks at the center of the system band.

However, handover procedures need to be quickly performed in order to maintain communications, when the user equipment terminal moves fast. Measurement of RSRP within such a narrow bandwidth needs a longer measurement time interval, and thus the probability of unsuccessful handover may be higher.

In order to achieve higher quality in handover when the user equipment terminal moves fast, it is desirable that measurement of RSRP be performed with a wider bandwidth. However, measurement with a wider bandwidth may increase or complicate processing in the user equipment terminal. Specifically, in order to perform measurement with a wider bandwidth, the user equipment terminal needs to perform measurement for the neighbor cell while communicating in the serving cell. For this reason, an FFT (Fast Fourier Transform) processing unit for measurement for the neighbor cell is needed in addition to an FFT processing unit for receiving signals in the serving cell. The scale of the FFT processing unit, i.e. the cost or complexity, increases with the increase in the measurement bandwidth.

In view of this problem, it is a general object of the present invention to provide a user equipment terminal and a signal power measurement method in which a movement speed of the user equipment terminal is estimated and a measurement bandwidth is controlled based on the estimated movement speed, thereby achieving high quality in handover when the user equipment terminal moves fast, while reducing processing in the user equipment terminal.

Means for Solving the Problem(s)

In one aspect of the present invention, there is provided a user equipment terminal for measuring signal power in a neighbor cell, including:

a movement speed estimating unit configured to estimate a movement speed of the user equipment terminal or a fading frequency of a propagation;

a measurement bandwidth determining unit configured to determine a measurement bandwidth according to the movement speed or the fading frequency of the propagation; and a measurement unit configured to measure signal power in the neighbor cell within the determined measurement bandwidth.

In another aspect of the present invention, there is provided a signal power measurement method in a user equipment terminal for measuring signal power in a neighbor cell, including the steps of:

estimating a movement speed of the user equipment terminal or a fading frequency of a propagation;

determining a measurement bandwidth according to the movement speed or the fading frequency of the propagation; and measuring signal power in the neighbor cell within the determined measurement bandwidth.

Advantageous Effect of the Invention

According to an embodiment of the present invention, it is possible to achieve high quality in handover when the user equipment terminal moves fast, while reducing processing in the user equipment terminal.

BRIEF DESCRIPTION OF THE DRAWINGS

FIG. 2A shows a conceptual diagram of a variable system bandwidth.

FIG. 4 shows a relationship between a movement speed and a measurement bandwidth in accordance with an embodiment of the present invention.

FIG. 5 shows a block diagram of a user equipment terminal in accordance with a first embodiment of the present invention.

FIG. 6 shows a flowchart of a signal power measurement and handover method in accordance with an embodiment of the present invention.

DETAILED DESCRIPTION OF THE PREFERRED EMBODIMENTS

Figure 1:
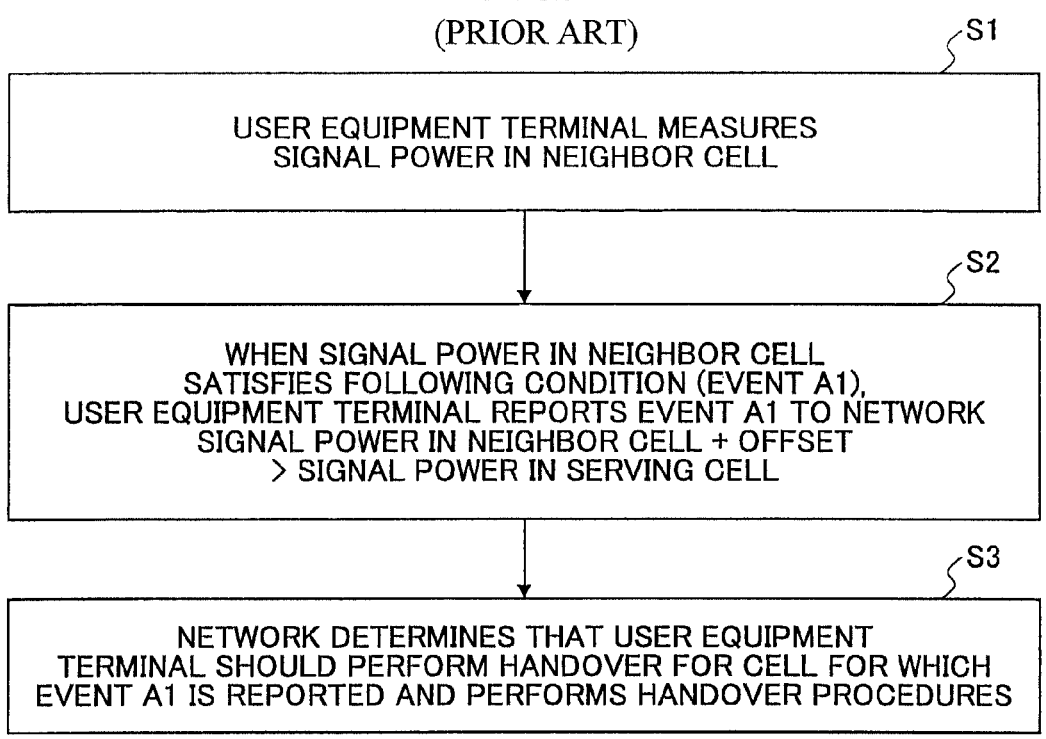
FIG. 1 shows a flowchart of a handover method in a mobile communication system.
Figure 2B:
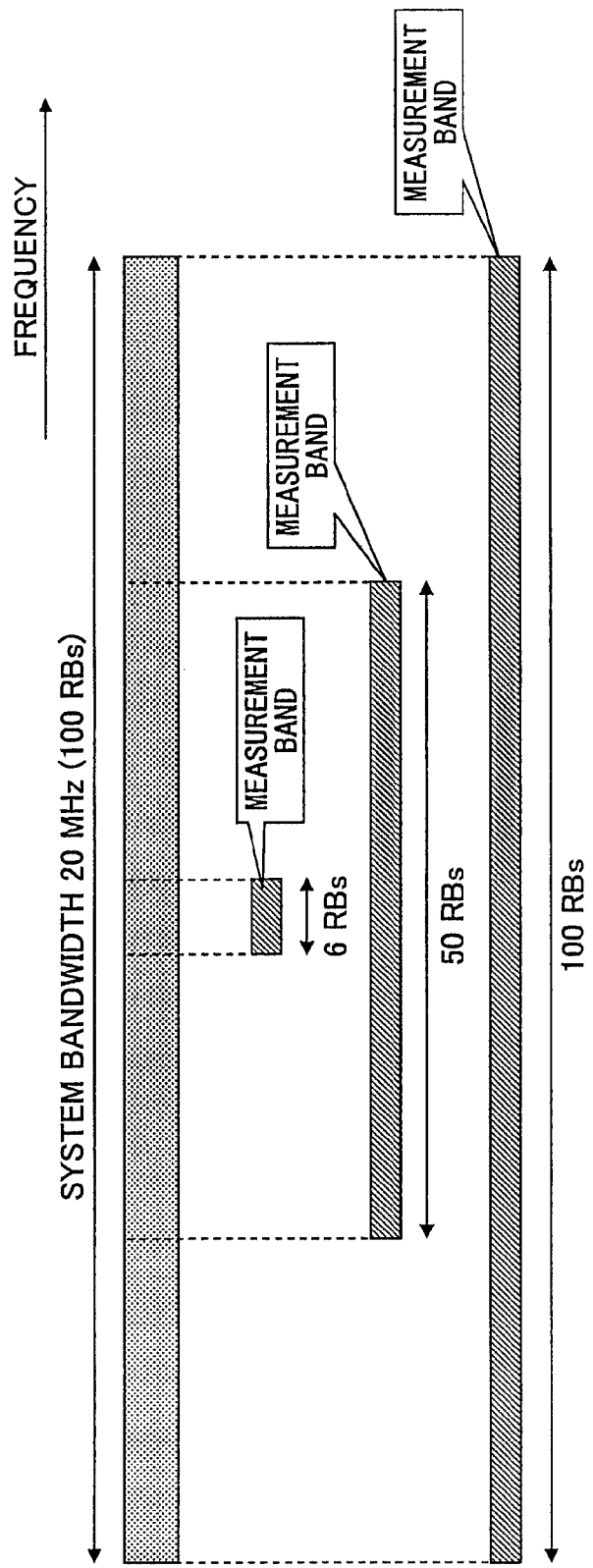
FIG. 2B shows measurement bands of signal power in user equipment terminals.
Figure 3:
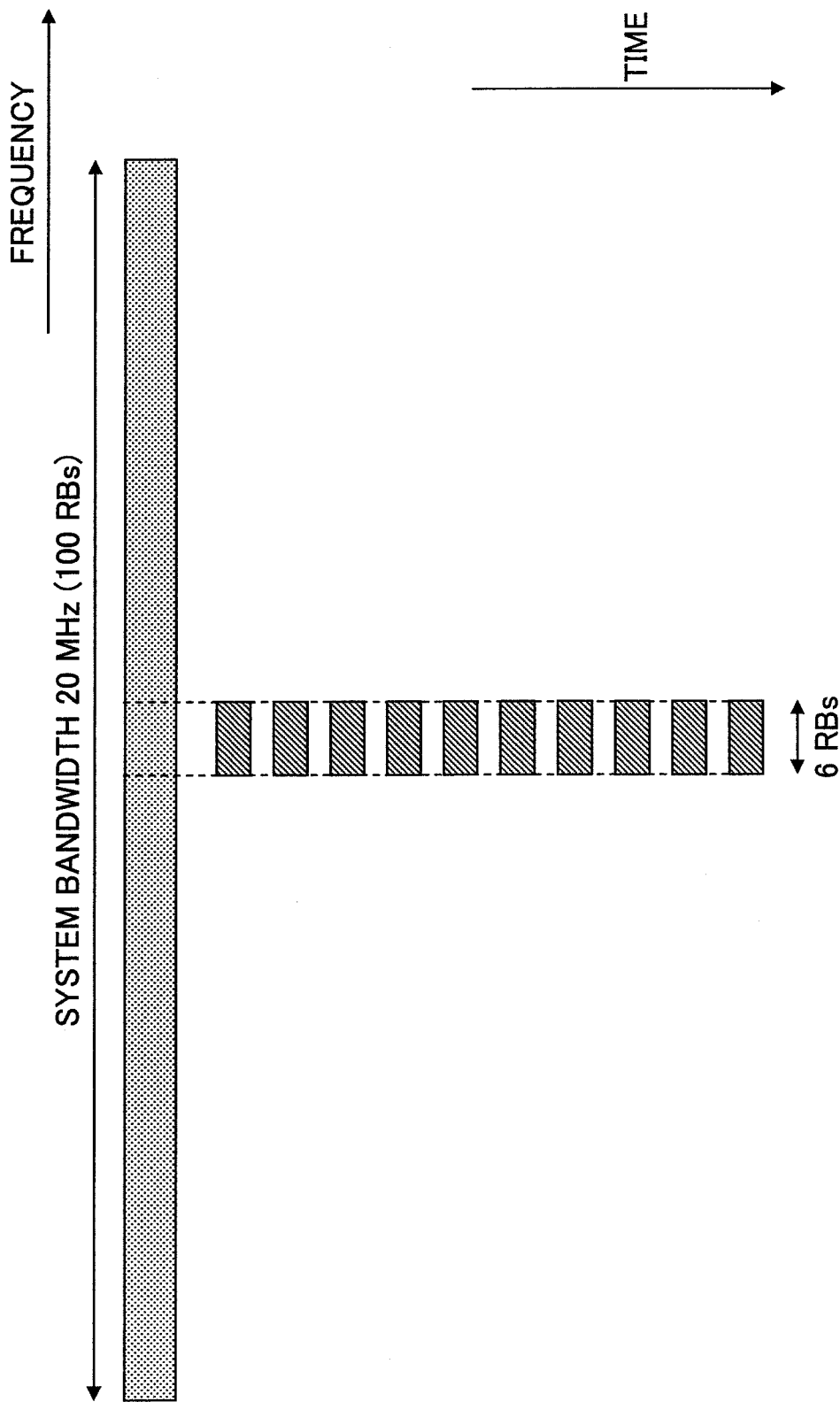
FIG. 3 shows a relationship between a measurement band and a measurement time of signal power.

Description of Notations 10 user equipment terminal
101 receiving unit
102 movement speed estimating unit
103 measurement bandwidth determining unit
104 GPS unit
105 handover count retrieving unit
106 FFT processing unit

BEST MODE OF CARRYING OUT THE INVENTION

With reference to the accompanying drawings, embodiments of the present invention are described below.

FIG. 4 shows a relationship between an estimated movement speed and a measurement bandwidth of signal power in accordance with an embodiment of the present invention. In this embodiment, a user equipment terminal estimates the movement speed of the user equipment terminal, determines a measurement bandwidth based on the estimated movement speed, and measures signal power (RSRP) within the determined measurement bandwidth.

For example, as shown in FIG. 4, when the estimated movement speed is fast (fast movement), the measurement bandwidth is determined to be equal to fifty resource blocks. When the estimated movement speed is medium (medium movement), the measurement bandwidth is determined to be equal to twenty-five resource blocks. When the estimated movement speed is slow (slow movement), the measurement bandwidth is determined to be equal to six resource blocks. According to this determination, processing in the user equipment terminal can be reduced, since the user equipment terminal may measure signal power within a narrower bandwidth during slow movement. During fast movement, the user equipment terminal can accurately measure signal power in a shorter time interval by measurement within a wider bandwidth, and thereby reduce the duration needed for handover. As a result, quality in handover can be improved.

For example, the fast movement may be when the estimated movement speed is greater than or equal to 120 km/h, the medium movement may be when the estimated movement speed is less than 120 km/h and greater than or equal to 30 km/h, and the slow movement may be when the estimated movement speed is less than 30 km/h. The movement speeds such as 120 km/h and 30 km/h are mere examples and any other movement speed may be used.

While the measurement bandwidth during fast movement is equal to fifty resource blocks, the measurement bandwidth during medium movement is equal to twenty-five resource blocks, and the measurement bandwidth during slow movement is equal to six resource blocks in this embodiment, these values are mere examples and any number of resource blocks may be used.

While the system bandwidth is equal to 20 MHz in this embodiment, this value is mere example and any other system bandwidth may be used for measurement.

While three-step determination (fast movement, medium movement, and slow movement) is made according to the estimated movement speed in this embodiment, two-step determination (fast movement and slow movement) or four or more step determination may be made.

In this embodiment, when the estimated movement speed is fast (fast movement), the measurement bandwidth is determined to be equal to fifty resource blocks. When the estimated movement speed is medium (medium movement), the measurement bandwidth is determined to be equal to twenty-five resource blocks. When the estimated movement speed is slow (slow movement), the measurement bandwidth is determined to be equal to six resource blocks. Alternatively, when the estimated movement speed is fast (fast movement), the measurement bandwidth may be determined to be equal to six resource blocks. When the estimated movement speed is medium (medium movement), the measurement bandwidth may be determined to be equal to twenty-five resource blocks. When the estimated movement speed is slow (slow movement), the measurement bandwidth may be determined to be equal to fifty resource blocks.

Since the averaging effect in the time direction can be achieved in a shorter averaging time interval during fast movement, signal power may be measured within a sufficiently narrower bandwidth. As a result, processing in the user equipment terminal can be reduced. In addition, since the averaging effect in the time direction cannot be easily achieved during slow movement, the user equipment terminal can accurately measure signal power in a shorter time interval by measurement within a wider bandwidth, and thereby reduce the duration needed for handover. As a result, quality in handover can be improved.

While the movement speed is estimated in this embodiment, a fading frequency of the propagation may be estimated.

The movement speed or the fading frequency of the propagation may be estimated based on a time correlation value of a downlink reference signal. Alternatively, the movement speed or the fading frequency of the propagation may be estimated based on the number of cells for which handover or cell reselection is performed in a predetermined time interval. Alternatively, the movement speed or the fading frequency of the propagation may be estimated based on GPS (Global Positioning System) positional information.

While RSRP is used for measurement in this embodiment, any other value such as RSRQ, RSSI, or RS-SIR may be used for measurement.

While these embodiments focus on measurement for handover for the neighbor cell during communications with the network (base station), i.e. measurement in the RRC connected state, the present invention is also applicable to measurement for the neighbor cell in the idle state. It should be noted that measurement for the neighbor cell in the idle state is performed for the purpose of cell reselection, for example.

<Configuration of a User Equipment Terminal>

FIG. 5 shows a block diagram of a user equipment terminal 10 in accordance with an embodiment of the present invention. The user equipment terminal 10 includes a receiving unit 101, a movement speed estimating unit 102, a measurement bandwidth determining unit 103, a GPS unit 104, a handover count retrieving unit 105, and an FFT processing unit 106.

The receiving unit 101 receives signals from the base station in the neighbor cell. The received signals include a reference signal used to measure signal power. The receiving unit 101 also obtains a time correlation value of the reference signal, and then supplies it to the movement speed estimating unit 102.

The movement speed estimating unit 102 estimates a movement speed of the user equipment terminal or a fading frequency of the propagation, and then supplies the estimated movement speed or the estimated fading frequency of the propagation to the measurement bandwidth determining unit 103.

For example, the movement speed estimating unit 102 may receive the time correlation value of the reference signal from the receiving unit 101 and estimate the movement speed or the fading frequency of the propagation based on the time correlation value of the reference signal. For example, when time correlation with respect to the received signal of the reference signal is shown in a longer time interval based on the time correlation value of the reference signal, the movement speed estimating unit 102 may estimate that the movement speed is slow or that the fading frequency of the propagation is low. When time correlation with respect to the received signal of the reference signal is shown only in a shorter time interval, the movement speed estimating unit 102 may estimate that the movement speed is high that the fading frequency of the propagation is high. More specifically, when the time interval during which time correlation is shown is longer than a predetermined threshold, the movement speed estimating unit 102 may estimate that the movement speed is slow. When the time interval during which time correlation is shown is shorter than the predetermined threshold, the movement speed estimating unit 102 may estimate that the movement speed is fast. Alternatively, when the time correlation value in a predetermined time interval is less than a predetermined value, the movement speed estimating unit 102 may estimate that the movement speed is fast. When the time correlation value in the predetermined time interval is greater than or equal to the predetermined value, the movement speed estimating unit 102 may estimate that the movement speed is slow.

For example, the movement speed estimating unit 102 may also receive GPS positional information from the GPS unit 104 and estimate the movement speed or the fading frequency of the propagation based on the positional information. For example, the movement speed estimating unit 102 may calculate a moving distance in a predetermined time interval based on the GPS positional information, divide the moving distance by the predetermined time interval, and estimate the movement speed or the fading frequency of the propagation. For example, when the moving distance in the predetermined time interval is short, the movement speed estimating unit 102 may estimate that the movement speed is slow or that the fading frequency of the propagation is low. When the moving distance in the predetermined time interval is long, the movement speed estimating unit 102 may estimate that the movement speed is fast or that the fading frequency of the propagation is high.

For example, the movement speed estimating unit 102 may also receive the number of handover counts in a predetermined time interval from the handover count retrieving unit 105 and estimate the movement speed or the fading frequency of the propagation based on the number of handover counts in the predetermined time interval. For example, when the number of handover counts in the predetermined time interval is small, the movement speed estimating unit 102 may estimate that the movement speed is slow or that the fading frequency of the propagation is low. When the number of handover counts in the predetermined time interval is large, the movement speed estimating unit 102 may estimate that the movement speed is fast or that the fading frequency of the propagation is high. In this embodiment, handover includes handover during communications and cell reselection in the idle state.

The measurement bandwidth determining unit 103 receives the estimated movement speed from the movement speed estimating unit 102 and determines a measurement bandwidth based on the movement speed. The measurement bandwidth may be determined as described above with reference to FIG. 4.

The GPS unit 104 receives GPS positional information and supplies it to the movement speed estimating unit 102.

The handover count retrieving unit 105 retrieves the number of handover counts in a predetermined time interval and supplies it to the movement speed estimating unit 102. For example, the handover count retrieving unit 105 may count, as the number of handover counts, the number of cells corresponding to the serving cell in the predetermined time interval. When the handover count retrieving unit 105 counts the number of cells corresponding to the serving cell in the predetermined time interval, the handover count retrieving unit 105 may not increment the number of cells corresponding to the serving cell in the case where the same serving cell has already been counted (the handover count retrieving unit 105 may not double-count the same serving cell in the predetermined time interval).

The FFT processing unit 106 performs FFT processing of the received signals in the neighbor cell within the bandwidth determined by the measurement bandwidth determining unit 103. Then, signal power of the reference signal in the neighbor cell is measured, which is included in the signals after the FFT processing. The measured signal power may be averaged in the time direction. For example, the FFT processing unit 106 may average signal power within the averaging time interval of 200 ms in the Layer-1. The FFT processing unit 106 may further average, in the Layer-3, the value which is averaged in the Layer-1 according to the following equation.

$$F_n = (1-a)*F_{n-1} + a*M_n$$

In this equation, 'a' is a coefficient for the averaging process in the Layer-3, '$M_n$' is the value which is averaged in the Layer-1 at the time 'n', and '$F_n$' is the value which is averaged in the Layer-3 at the time 'n'.

The user equipment terminal 10 compares signal power in the neighbor cell as described above and signal power in the serving cell, and then determines whether to perform handover.

While RSRP is used for measurement in this embodiment, any other value such as RSRQ, RSSI, or RS-SIR may be used for measurement.

While this embodiment focus on measurement for handover for the neighbor cell during communications with the network (base station), i.e. measurement in the RRC connected state, the present invention is also applicable to measurement for the neighbor cell in the idle state. It should be noted that measurement for the neighbor cell in the idle state is performed for the purpose of cell reselection, for example.

<Flowchart of a Signal Power Measurement and Handover Method>

FIG. 6 shows a flowchart of a signal power measurement and handover method in accordance with an embodiment of the present invention.

First, the user equipment terminal estimates a movement speed or a fading frequency of the propagation (S101). When the movement speed or the fading frequency of the propagation is estimated, the user equipment terminal compares the estimated movement speed or the estimated fading frequency of the propagation with a predetermined threshold (S102). When the estimated movement speed is faster than the predetermined threshold or when the estimated fading frequency of the propagation is higher than the predetermined threshold, the method proceeds to step S103. Otherwise, the method proceeds to step S104. In step S103, the user equipment terminal measures signal power in the neighbor cell with a wider measurement bandwidth (S103). In step S104, the user equipment terminal measures signal power in the neighbor cell with a narrower measurement bandwidth (S104).

Then, the user equipment terminal determines whether the signal power in the neighbor cell satisfies the following condition.

signal power in the neighbor cell+offset>signal power in the serving cell

When this condition is satisfied, the user equipment terminal reports an event (Event A1) to the network (base station) (S105). When the network receives the event (Event A1), the network determines that the user equipment terminal should perform handover to the cell for which the event is reported, and then performs handover procedures (S106). While the event is defined as Event A1, the event may be defined as any other event such as Event A3.

While RSRP is used for measurement in this embodiment, any other value such as RSRQ, RSSI, or RS-SIR may be used for measurement.

It should be noted that the method of determining the measurement bandwidth based on the movement speed and measuring signal power in the neighbor cell based on the measurement bandwidth may be carried out in the connected state or in the idle state.

According to an embodiment of the present invention, it is possible to achieve high quality in handover when the user equipment terminal moves fast, while reducing processing in the user equipment terminal. While the preferred embodiments of the present invention have been described, the present invention is not limited to these embodiments. Rather, the present invention can be changed or modified within the scope of the appended claims. For example, the present invention is not limited to the LTE system, but may be applied to any mobile communication system. In addition, the present invention is not limited to the mobile communication system in which the center frequency of each cell is identical, but may be applied to any mobile communication system in which center frequencies of cells may be different and different frequency measurement is performed. Furthermore, the present invention may be applied to any mobile communication system in which radio access technologies (RATs) of cells may be different and different RAT measurement is performed.

This international patent application is based on Japanese Priority Application No. 2007-286737 filed on Nov. 2, 2007, the entire contents of which are incorporated herein by reference.

The invention claimed is:

1. A user equipment terminal for measuring signal power in a neighbor cell, comprising:
   a movement speed estimating unit configured to estimate a movement speed of the user equipment terminal or a fading frequency of a propagation;
   a measurement bandwidth determining unit configured to determine a number of resource blocks for measuring signal power of the neighbor cell among a plurality of resource blocks included in a system bandwidth according to the movement speed or the fading frequency of the propagation; and
   a measurement unit configured to measure signal power of the neighbor cell within a measurement bandwidth corresponding to the determined number of resource blocks,
   wherein, the movement speed estimating unit estimates that the movement speed is slower than a second threshold or that the fading frequency is lower than a third threshold, when a time interval during which time correlation of a downlink reference signal is shown is longer than a first threshold, and estimates that the movement speed is faster than the second threshold or that the fading frequency is higher than the third threshold, when the time interval during which time correlation of the downlink reference signal is shown is shorter than the first threshold, and the measurement bandwidth determining unit decreases the number of resource blocks when the movement speed is faster than the second threshold or when the fading frequency is higher than the third threshold and increases the number of resource blocks when the movement speed is slower than the second threshold or when the fading frequency is lower than the third threshold.

2. A signal power measurement method in a user equipment terminal for measuring signal power in a neighbor cell, comprising the steps of:

estimating a movement speed of the user equipment terminal or a fading frequency of a propagation;

determining a number of resource blocks for measuring signal power of the neighbor cell among a plurality of resource blocks included in a system bandwidth according to the movement speed or the fading frequency of the propagation; and measuring signal power of the neighbor cell within a measurement bandwidth corresponding to the determined number of resource blocks, wherein, the estimating step comprises estimating that the movement speed is slower than a second threshold or that the fading frequency is lower than a third threshold when a time interval during which time correlation of a downlink reference signal is shown is longer than a first threshold, and estimating that the movement speed is faster than the second threshold or that the fading frequency is higher than the third threshold, when the time interval during which time correlation of the downlink reference signal is shown is shorter than the first threshold, and the measuring step comprises decreasing the number of resource blocks when the movement speed is faster than the second threshold or when the fading frequency is higher than the third threshold and increasing the number of resource blocks when the movement speed is slower than the second threshold or when the fading frequency is lower than the third threshold.

* * * * *